(12) United States Patent  
Bierlein et al.

(10) Patent No.: US 12,287,002 B2  
(45) Date of Patent: Apr. 29, 2025

(54) ROLLER BEARING

(71) Applicant: Schaeffler Technologies AG & Co. KG, Herzogenaurach (DE)

(72) Inventors: Andreas Bierlein, Haßfurt (DE); Rainer Schroeder, Egenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 18/253,131

(22) PCT Filed: Oct. 15, 2021

(86) PCT No.: PCT/DE2021/100829  
§ 371 (c)(1),  
(2) Date: May 16, 2023

(87) PCT Pub. No.: WO2022/105956  
PCT Pub. Date: May 27, 2022

(65) Prior Publication Data  
US 2023/0417280 A1 Dec. 28, 2023

(30) Foreign Application Priority Data  
Nov. 20, 2020 (DE) .......................... 102020130707.1

(51) Int. Cl.  
*F16C 19/38* (2006.01)  
*F16C 23/08* (2006.01)  
*F16C 33/60* (2006.01)

(52) U.S. Cl.  
CPC .............. *F16C 19/38* (2013.01); *F16C 23/08* (2013.01); *F16C 23/086* (2013.01); *F16C 33/60* (2013.01)

(58) Field of Classification Search  
CPC ........ F16C 19/182; F16C 19/38; F16C 23/08; F16C 23/086; F16C 33/583; F16C 33/60  
See application file for complete search history.

(56) References Cited

U.S. PATENT DOCUMENTS

| | | | | |
|---|---|---|---|---|
| 8,690,446 | B2* | 4/2014 | Habibvand | F16C 25/08 384/493 |
| 11,846,323 | B2* | 12/2023 | Bierlein | F16C 23/086 |
| 2012/0087611 | A1 | 4/2012 | Habibvand | |

FOREIGN PATENT DOCUMENTS

| DE | 363532 C | * 11/1922 |
|---|---|---|
| DE | 102011086925 A1 | 5/2013 |

(Continued)

OTHER PUBLICATIONS

Translation of JP2007002914 obtained Sep. 19, 2024.*

*Primary Examiner* — James Pilkington  
(74) *Attorney, Agent, or Firm* — Price Heneveld LLP

(57) ABSTRACT

A roller bearing includes inner and outer rings, and a plurality of rolling bodies configured to roll in two rows on corresponding raceways on the inner and outer rings. At least one of the inner ring and outer ring is split radially to form at least two ring portions. The raceway in an abutment region between the at least two ring portions has a ground recess locally deepening the raceway. Each ground recess on the outer ring has an arcuate course extending transversely to the abutment region, the greatest radial depth of the ground recess lies in the abutment region, and each ground recess extends in the circumferential direction of the raceway of the outer ring over a length which is at most the circumferential distance between the contact point of a first rolling body and the contact point of a second rolling body.

11 Claims, 5 Drawing Sheets

(56) References Cited

FOREIGN PATENT DOCUMENTS

Figure 1:
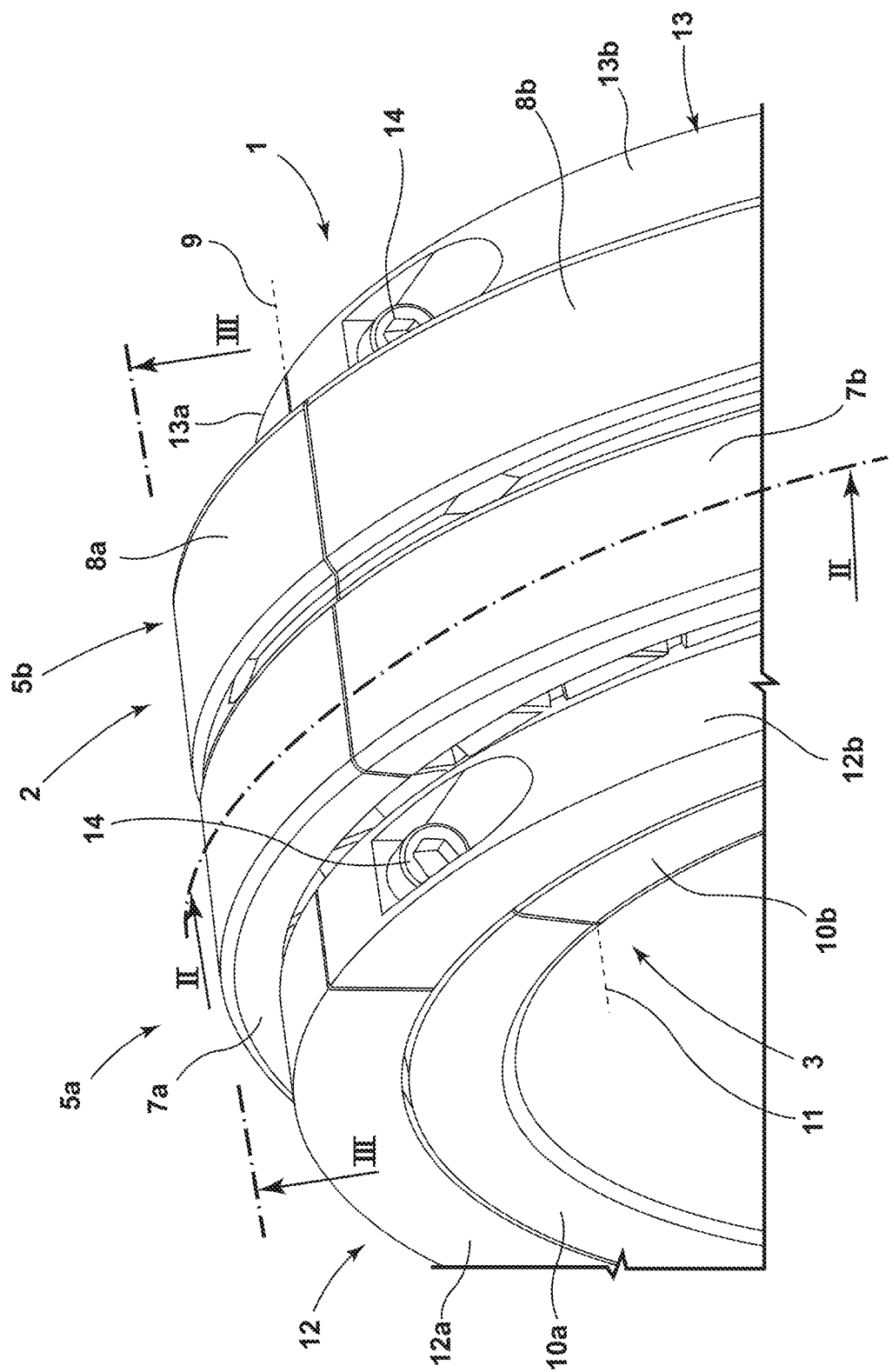

| DE | 102017110742 A1 | | 11/2018 | |
|----|-----------------|---|---------|---|
| FR | 919378 A | * | 9/1945 | |
| JP | 2007002914 A | * | 1/2007 | ............. F16C 33/60 |
| WO | 2013047617 A1 | | 4/2013 | |

* cited by examiner

ROLLER BEARING

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/2021/100829, filed on Oct. 15, 2021, designating the United States of America, which in turn claims the benefit of priority under 35 U.S.C. §§ 119, 365 of German Patent Application No. 102020130707.1, filed Nov. 20, 2020, the contents of which are relied upon and incorporated herein by reference in their entirety.

FIELD OF THE DISCLOSURE

The disclosure relates to a roller bearing, in particular a two-row self-aligning roller bearing, comprising an inner ring and an outer ring as well as a plurality of rolling bodies rolling in two rows on corresponding raceways on the inner ring and on the outer ring, wherein the outer ring is split radially to form at least two ring portions.

BACKGROUND OF THE DISCLOSURE

A two-row self-aligning roller bearing is known, for example, from DE 10 2011 086 925 A1. The self-aligning roller bearing described there is distinguished by the outer ring and/or the inner ring consisting of two ring portions or ring halves that adjoin each other circumferentially, that is, the respective ring is split radially, wherein a radial split plane is given in each case. Such split rings are mainly used for large bearings, as this makes it easier to mount the bearings. Due to the multi-part nature of the inner and/or outer ring, it is possible to assemble the parts thereof separately. Such bearings are used, for example, in complex drive trains and offer the advantage that, in the event of bearing damage, the bearing can be replaced without partial or complete dismantling of the drive train.

The respective ring is usually split in that it is broken at defined points or in a defined plane, so that there is no material removal when separating, which would be the case, for example, if the ring were sawn apart. A defined fracture line forms during fracture, which means that the ring material fractures along the grain boundaries, wherein the fracture line progresses in the desired plane. During assembly, the corresponding ring portions are then reassembled. In the case of a split inner ring, this is fixed on the shaft, for example, by means of clamping rings running around the side, while a split outer ring is inserted into the corresponding housing component.

The disclosure is therefore based on the object of specifying a comparatively improved self-aligning roller bearing.

If roller bearings or self-aligning roller bearings split in this way are used in wind turbines, for example, the rolling bodies that roll on the raceways of the ring portions and roll over the transitions between ring portions subject the abutment points between the ring portions to high loads. It has been found that due to a fracture of the ring, the fracture line of which runs transversely to the raceway, due to the microstructure of the ring material at the edges, which are present on the ring portions on the raceway side, there can be small and minute peaks or uneven portions that affect the evenness of the raceway. If, during operation, the rolling bodies roll over this slightly disrupted raceway region, this can result in damage to the raceway over time, and the rolling bodies can also be damaged. To counteract this phenomenon, it is known from DE10 2017 110 742 A1 to provide the precise abutment region where the raceway sections of two ring portions meet with a ground recess, i.e., to locally deepen the raceway there slightly, in which a cross-section has a continuous run, producing a groove-like or hollow-like deepening in the abutment region, which is only a few tenths of a millimeter to a few millimeters deep and wide.

Nevertheless, the connecting means which form the respective ring portions of the outer ring of the roller bearing are heavily stressed. In the operation of split roller bearings, for example, it has been shown that the connecting means between the ring portions on the outer ring become loose or even tear off, thereby leading to bearing damage.

The present disclosure is therefore based on the object of specifying a split roller bearing, in particular self-aligning roller bearing, with an improved service life in relation to the connecting means between the ring portions.

SUMMARY OF THE DISCLOSURE

According to an aspect of the present disclosure, if at least each ground recess on the outer ring has an arcuate course extending transversely to the abutment region, wherein the greatest radial depth T of the ground recess lies exactly in the abutment region, and each ground recess extends in the circumferential direction of the raceway of the outer ring over a length which is at most the circumferential distance X between the contact point of a first rolling body and the contact point of a rolling body that is next but one in relation to this first rolling body with the raceway and which is greater than half the diameter of a rolling body at the point of its greatest diameter, a threading-out or threading-in track for rolling bodies is created on both sides of the abutment region between two ring portions created which, in its function as a threading-out track, gradually reduces the pressure of the rolling bodies in the raceways until the direct abutment region is reached and which, in its function as a threading-in track, gradually increases the pressure on the rolling elements after the direct abutment region has rolled over into the raceways. The gradual transition in particular ensures that the connecting means are hardly or not at all loaded when rolling over the abutment regions in the circumferential direction, but that such forces alone lead to an elastic deformation of the ring portions.

It is advantageous if the depth T of the ground recess is between 0.05 and 0.0001 times the diameter D of the rolling body at the point of its greatest diameter, as such depths T do not require any measures to compensate for the weakening of the outer ring.

Assembly and disassembly are simplified if the inner ring and/or the outer ring is split radially into more than two ring portions, wherein a ground recess is provided in each abutment region. It is preferred here if the outer ring is split into two planes running in a mutually orthogonal manner. The ring then consists of four, for example, 90° circumferential ring portions that complement each other in terms of circumference. In this case, four abutment points are provided on the split ring, which have corresponding ground recesses.

An expedient development of the disclosure provides that the outer ring is split axially into two partial rings to form ring portions arranged to be axially adjacent to one another. According to this configuration, the outer ring, if it is not split radially, is split into two separate partial rings that adjoin one another axially. Due to the axial split, there are then two ring portions, each of which forms a one-piece partial ring. However, if the outer ring is split in one or more radial planes into circumferentially complementary ring portions, and if it is also split in an axial plane, then there is a plurality of corresponding ring portions, which on the one hand complement each other circumferentially to form a partial ring, wherein on the other hand the two multi-part partial rings then complement each other to form the entire outer ring. If the outer ring is split, for example, into two ring portions radially along a plane and is also split axially, then there are a total of four ring portions, wherein two ring portions each form a partial ring. If the outer ring is split radially into two mutually orthogonal planes, and if an axial split is also provided, there are a total of eight ring portions, wherein four ring portions complement each other to form a partial ring. This axial split also simplifies the mounting of the bearing, in particular when it is an asymmetric bearing.

It is conceivable that the partial rings bear against one another in the assembly position, wherein at least one radial bore is provided for supplying a lubricant into the interior of the bearing in the region of the axial parting point. Thus, the partial rings abut each other directly here. To be able to lubricate the bearing, it is therefore expedient if one or more radial bores are provided which penetrate the assembled outer ring in the region of the parting plane or parting point. This can be used to supply lubricant to the inside of the roller bearing to enable a permanent lubrication of the bearing.

As an alternative to this, it is conceivable that the two partial rings are spaced apart axially to form an annular gap. This axial spacing can be made possible, for example, by slightly grinding the axial end faces, which means that less material is removed. If the partial rings are now mounted and pushed onto the rows of rolling bodies, it is not possible, due to the grinding or material removal, to push the partial rings completely against one another without causing an impermissibly high bearing preload. This means that there is a circumferential gap through which lubricant can be supplied on the one hand. On the other hand, it is possible to set the preload or bearing clearance for one or both rows of rolling bodies, depending on how the respective partial ring is positioned axially relative to the respective row of rolling bodies. The design is such that the two partial rings, viewed axially, do not even touch when the bearing clearance is zero, i.e., therefore there is no operating clearance or a low preload is set.

In addition to the outer ring, the inner ring can also be split into one or more levels. This also has a corresponding ground recess in the respective abutment region.

If the inner ring is also split radially, it is advisable to clamp it on the shaft using appropriate clamping rings. These clamping rings, which also consist of two ring halves, for example, are placed around the split inner ring at one end and screwed together so that the inner ring is clamped firmly onto the shaft.

The rolling bodies of each row themselves are preferably accommodated or guided in a rolling body cage. This rolling body cage, which preferably consists of a metal and is, for example, a sheet metal component, wherein an embodiment made of plastic is not excluded, fixes or guides the corresponding rolling bodies, in the present case self-aligning rollers. It can be expedient if each rolling body cage is split radially to form at least two cage sections, which in turn is beneficial to assembly.

The self-aligning roller bearing itself can be an asymmetric bearing, which means that the contact angle of the first row of rolling bodies and the contact angle of the second row of rolling bodies are different. Identical rolling bodies are preferably used in the two rows of rolling bodies, unlike in the prior art, in particular according to DE 10 2011 086 925 A1, where different rolling bodies are provided in the two rows of rolling bodies. However, it can also be a symmetrical bearing in which the same contact angles are present.

BRIEF PRESENTATION OF THE FIGURES

Figure 2A:
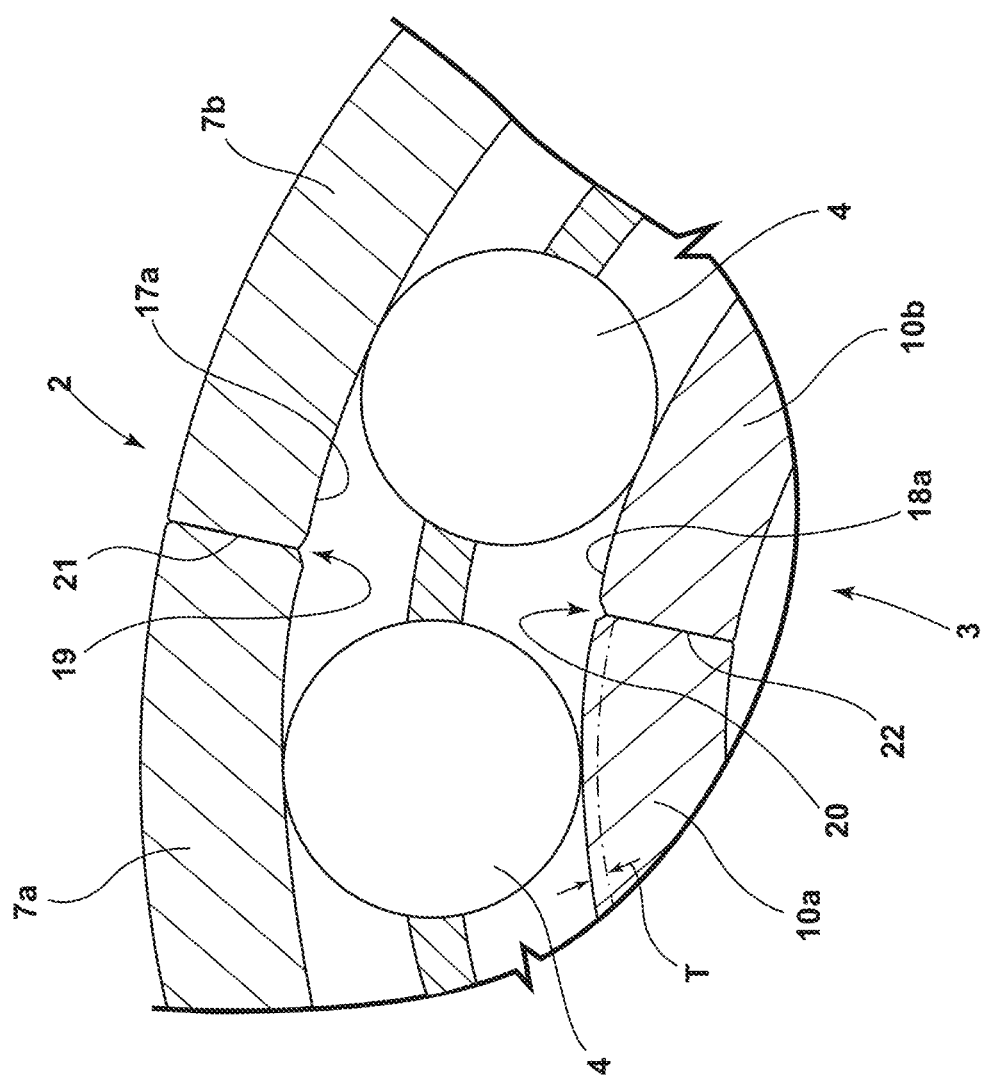
Figure 2B:
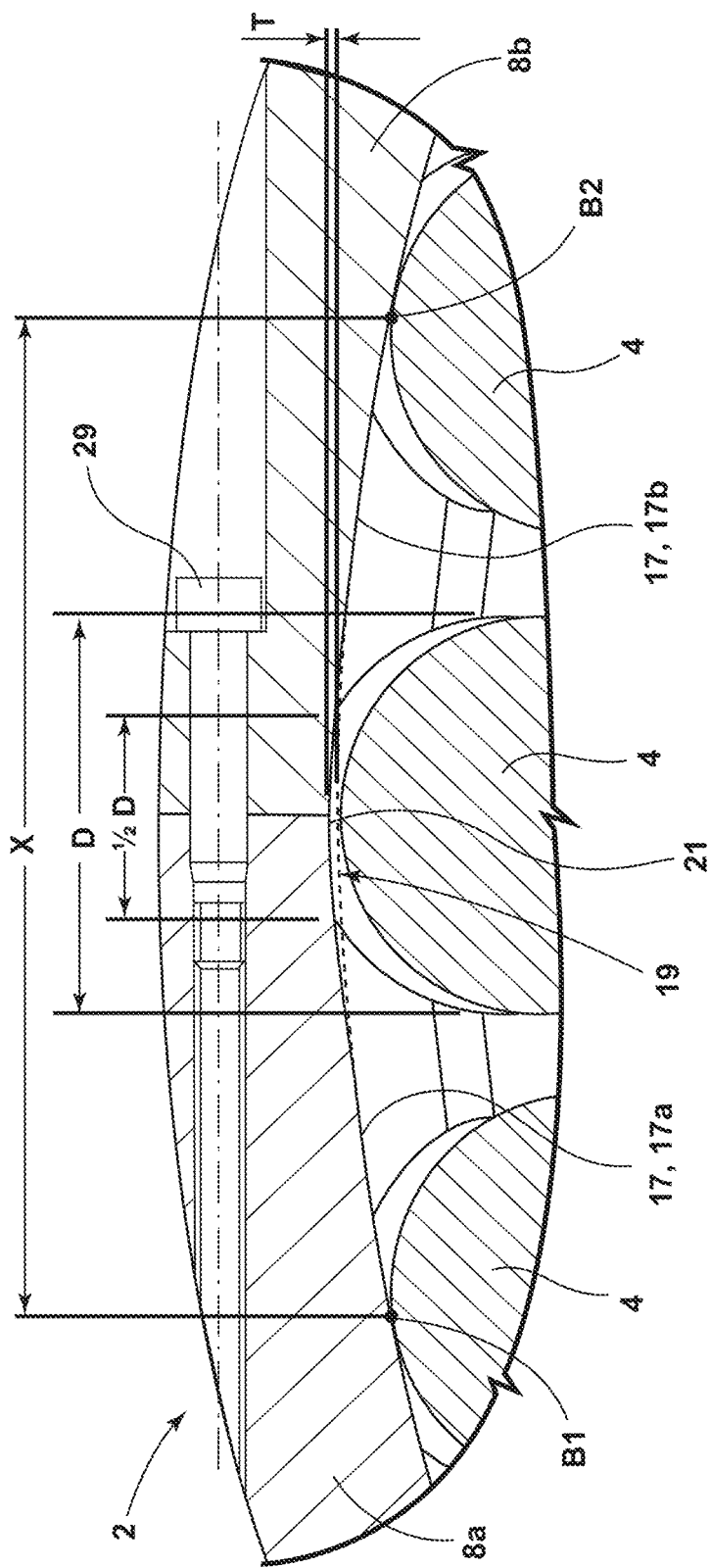
Figure 3:
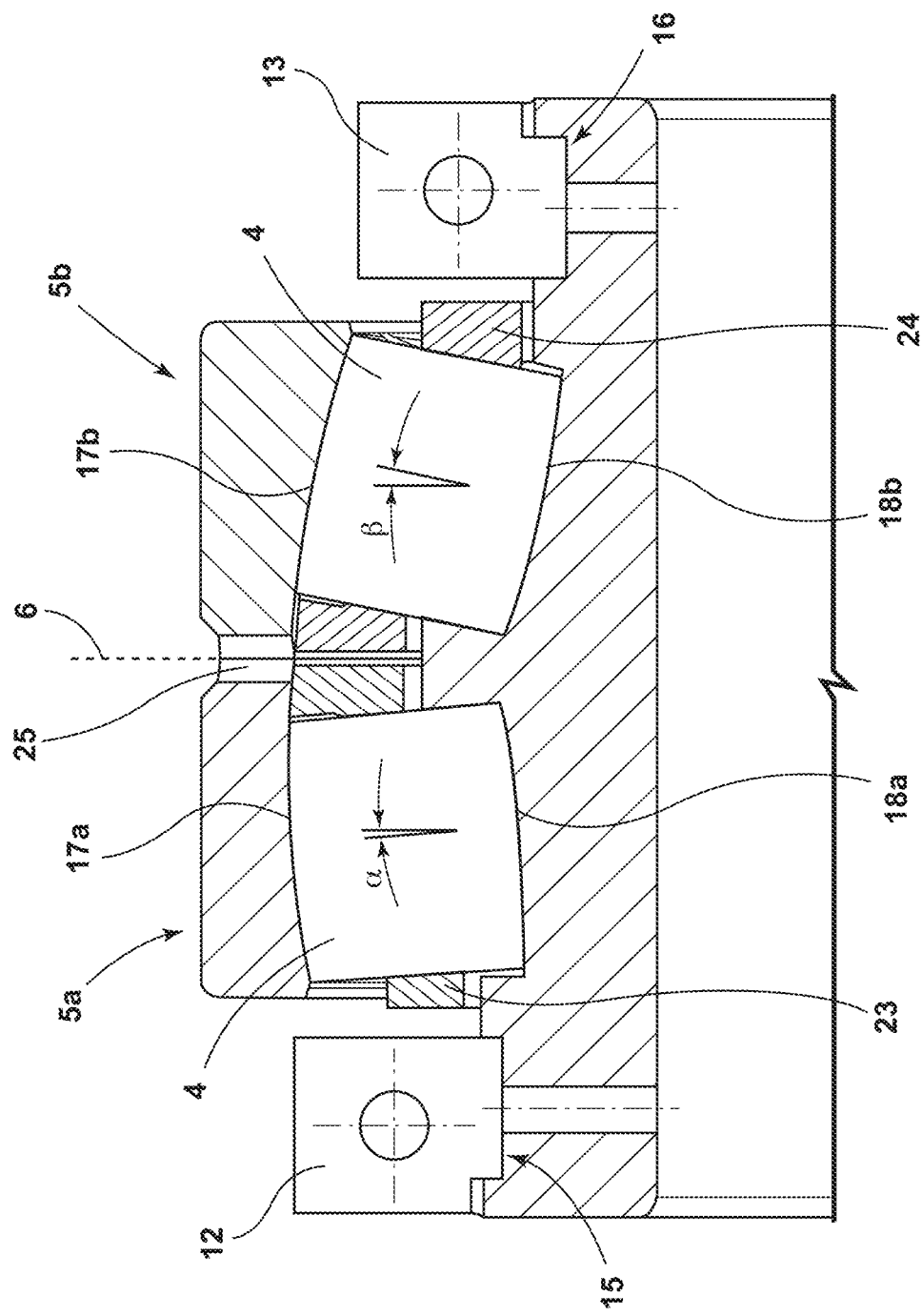
Figure 4:
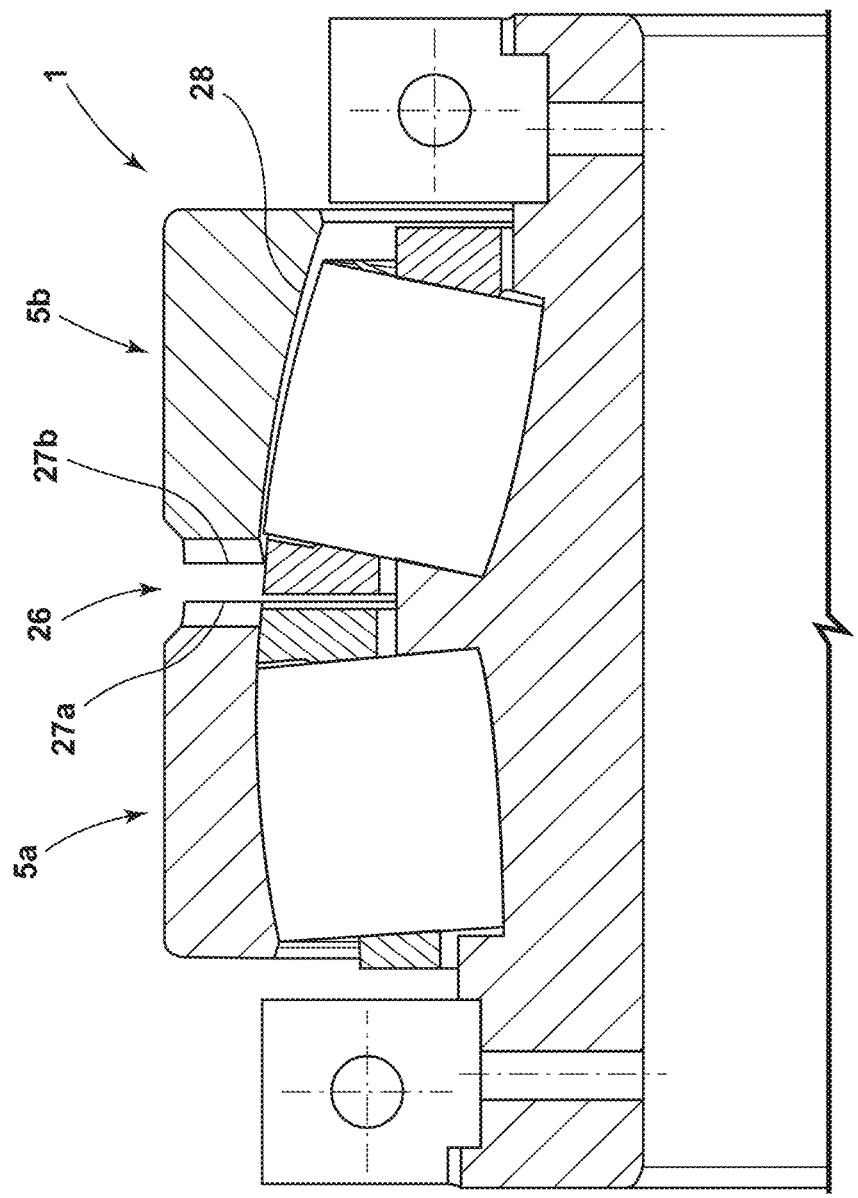

In the figures:

FIG. 1 shows a perspective partial view of a two-row self-aligning roller bearing according to the disclosure, FIG. 2*a* shows a sectional view of part of the self-aligning roller bearing from FIG. 1 along the line II-II, FIG. 2*b* shows an embodiment of a ground recess according to the disclosure, FIG. 3 shows a sectional view along the line III-III in FIG. 1, and FIG. 4 shows a second exemplary embodiment of a self-aligning roller bearing according to the disclosure in a sectional view corresponding to FIG. 3.

DETAILED DESCRIPTION

The present disclosure will now be explained in more detail with reference to the figures.

FIG. 1 shows an asymmetrical two-row self-aligning roller bearing 1 according to the disclosure, comprising an outer ring 2, an inner ring 3 and, see for example FIG. 2, a plurality of rolling bodies 4 rolling between the outer ring 2 and inner ring 3, here in the form of barrel-shaped rollers, as can be seen in FIG. 3. The rolling bodies 4 of both rows are identical, see, for example, FIGS. 3 and 4. Such a bearing can be used in a wind turbine, for example. In such an application, the bearing 1 usually has a width of several hundred millimeters.

In the example shown, the outer ring 2 consists of two partial rings 5*a*, 5*b*, after it has been split along an axial plane 6, as shown in particular in FIGS. 3 and 4.

Furthermore, each partial ring 5*a*, 5*b* consists of two ring portions 7*a*, 7*b* or 8*a*, 8*b*, which, see FIG. 1, complement each other circumferentially to form the respective partial ring 5*a*, 5*b*. The partial rings 5*a*, 5*b* are therefore split along a radial plane 9, see FIG. 1. This means that the outer ring 2 is split overall along an axial plane 6 and a radial plane 9 into a total of four ring portions 7*a*, 7*b* and 8*a*, 8*b*, which complement each other to form two circumferential partial rings 5*a*, 5*b*.

In the example shown, the inner ring 3 is also split into two ring portions 10*a*, 10*b* along a radial plane 11. These ring portions 10*a*, 10*b* also complement each other circumferentially to form the inner ring 3. However, as FIG. 3 shows, the inner ring 3 is not split axially; it is merely split along the radial plane 11.

To fix the inner ring 3 on a shaft (not shown) or the like, two clamping rings 12, 13 are provided, which in turn consist of two clamping ring portions 12*a*, 12*b* or 13*a*, 13*b*, and which are firmly connected to one another via corresponding screw connections 14 to split the inner ring 3, being arranged at the axial end portions thereof, to clamp firmly onto the shaft. For this purpose, the inner ring 3 can have a corresponding annular groove-like engagement geometry 15, 16 at the respective ends, in which the clamping rings 12, 13 engage in a form-fitting manner.

As described, the rings can be broken for a split along the respective plane 6 and in particular 9. Due to the structure of the material, usually steel, this means that after the fracture occurs along the grain boundaries, there is an undefined fracture zone from the surface so that local peaks or inhomogeneities result when the ring portions are assembled circumferentially, especially in the edge region of the ring portions 7a, 7b, 8a, 8b or 10a, 10b, where the respective raceways 17, 18 are located on the outer ring 2 or on the inner ring 3. These are now eliminated in that a ground recess 19, 20 is formed in the abutment region of two ring portions, see FIG. 2a. Such a ground recess 19, 20 forms a deepening 21, 22 having a depth T of a few tenths of a millimeter to a few millimeters, as shown in FIG. 2a in principle and by no means to scale for the deepening 22. This ground recess 19, 20 or the deepening 21, 22 extends over the entire length of the axial abutment. FIG. 2b shows a design according to the disclosure of a deepening 21 or a ground recess 19 on an outer ring 2 or between the ring portions 8a, 8b forming the outer ring 2. The ground recess 19 shown there is introduced as an arcuate, radially outwardly directed deepening 21 in the raceway 17 of the outer ring 2, wherein the greatest radial depth T of the deepening 21 is given where the two ring portions 8a, 8b abut one another. In the exemplary embodiment according to FIG. 2b, the depth T is approximately 0.025 of the diameter D of the rolling bodies 4. In the exemplary embodiment shown in FIG. 2b, this deepening 21 due to the recess 19 (i.e., the recess 19) has a width—i.e., a circumferential extent— which corresponds to the diameter D of the rolling bodies 4 rolling between the bearing rings 2, 3. This relatively large width of the recess 19 between the two ring portions 8a, 8b of the outer ring 2 serves a dual purpose. First, due to the respective ground recesses 19 (20) and the extension thereof in the circumferential direction of the bearing 1, the corresponding abutment regions are made load-free. In this way, despite the inevitable structural inhomogeneity in the abutment region due to the fracture, consistent operation may be achieved since the respective raceways in the abutment regions cannot be loaded. Second, large extensions of deepenings 21 (22) in the circumferential direction of the bearing 1 also ensure that the fitting screw 29, which according to FIG. 2b connect the two rings 8a, 8b forming the outer ring 2, are not loaded during operation of bearing 1 by circumferential rolling bodies 4, even if the bearing rings 2 formed by ring portions 8a, 8b deviate somewhat from the shape of an ideal circular ring. Rather, the large extents of the arcuate deepenings 21 (22) in the circumferential direction, together with the tangential transition region of the raceway and ground recess 19 (20), form a type of engagement or disengagement region for rolling bodies 4, which have passed the direct abutment point between two ring portions 8a, 8b. So that the respective deepenings 21, 22 can develop the effect of engagement and disengagement regions relieving the screws 29, the width of the deepenings 21, 22 in the circumferential direction should be equal to or greater than half the diameter D of the rolling bodies 4 used. Advantageous effects of deepenings 21, 22 are no longer perceptible if the extent thereof in the circumferential direction is greater than the circumferential distance X between the contact point B1 of a first rolling body 4 and the contact point B2 of a rolling body 4 that is next but one in relation to this first rolling body 4 with the raceway 17.

FIG. 3 shows a sectional view along the line III-III according to FIG. 1. As can be seen, the rolling bodies 4 are designed as barrel-shaped rollers, which roll on the corresponding raceways 17a, 18a or 17b, 18b of the inner ring 3 and the partial rings 5a, 5b. They are each accommodated and guided in a cage 23, 24, which can also be split radially into at least two cage halves. In the exemplary embodiment according to FIG. 3, the two partial rings 5a, 5b rest against one another axially, i.e., they touch one another in the region of the axial plane 6 separating them. To be able to supply lubricant, one or more radial bores 25 are provided.

Due to the fact that the partial rings 5a, 5b rest axially in the embodiment according to FIG. 3, it is not possible to adjust the bearing clearance within the respective rows of rolling bodies, and therefore there is no clearance compensation.

By contrast, FIG. 4 shows an embodiment of a two-row self-aligning roller bearing 1, which in this respect corresponds to the embodiment according to FIGS. 1 to 3, in particular with regard to the formation of the corresponding ring sections and the corresponding ground recesses 19, 20 at the abutment regions. In the embodiment according to FIG. 4, however, the partial rings 5a, 5b are not positioned so that they rest on one another axially; instead, a circumferential annular gap 26 is formed, via which the lubricant can be supplied on the one hand. This annular gap 26 can be formed by grinding the partial rings 5a, 5b on the end faces 27a, 27b thereof, which means that a small amount of material is removed.

On the other hand, since they do not touch each other, the clearance or the bearing clearance in the respective rows of rolling bodies can be adjusted, as shown in FIG. 4, where a small clearance 28 is shown as a gap in the region of the right-hand bearing row. Such a clearance or the bearing clearance can be set by appropriate axial positioning of the respective partial ring 5a, 5b, but it can also be completely compensated, if desired, which means that there is then no clearance or bearing clearance, and a low preload can be set as well, if necessary. Irrespective thereof, the two partial rings 5a, 5b are not axially in contact with one another, even when setting a low preload, since this would ultimately limit the setting options.

Finally, as shown in FIGS. 3 and 4, the self-aligning roller bearing 1 is an asymmetrical self-aligning roller bearing since the contact angles exhibited by the two rows of rolling bodies are slightly different. The contact angle of the row of rolling bodies shown on the right is slightly larger than the contact angle of the row of rolling bodies shown on the left. The contact angles are shown as examples with $\alpha$ and $\beta$. However, the rolling bodies 4 of both rows of rolling bodies are identical.

Although in the example described the outer ring 2 and the inner ring 3 are split circumferentially into two ring portions 7a, 7b or 8a, 8b with respect to the outer ring 2 and 10a, 10b with respect to the inner ring 3, it is of course conceivable to split one or both rings radially into two preferably orthogonal planes, so that each ring or partial ring would then consist of four complementary ring sections.

LIST OF REFERENCE NUMERALS

1 Self-aligning roller bearing
2 Outer ring
3 Inner ring
4 Rolling body
5a Partial ring
5b Partial ring
6 Axial plane
7a Ring portion
7b Ring portion
8a Ring portion
8b Ring portion
9 Radial plane
10a Ring portion
10b Ring portion 11 Radial plane
12 Clamping ring
12a Clamping ring portion
12b Clamping ring portion
13 Clamping ring portion
13a Clamping ring portion
13b Clamping ring portion
14 Screw connection
15 Engagement geometry
16 Engagement geometry
17 Raceway
17a Raceway
17b Raceway
18 Raceway
18a Raceway
18b Raceway
19 Ground recess
20 Ground recess
21 Deepening
22 Deepening
23 Cage
24 Cage
25 Radial bore
26 Annular gap
27a Front face
27b Front face
28 Clearance
29 Fitting screw
B1 Contact point B2 Contact point
D Diameter
T Depth
X Circumferential distance
α Angle
β Angle

The invention claimed is:

1. A roller bearing comprising:
an inner ring;
an outer ring; and
a plurality of rolling bodies configured to roll in two rows on corresponding raceways on the inner ring and on the outer ring, wherein the outer ring is split radially to form at least two ring portions, wherein the raceway in an abutment region between the at least two ring portions has a ground recess locally deepening the raceway, and wherein the ground recess has an arcuate course extending transversely to the abutment region, the greatest radial depth of the ground recess lies in the abutment region, and the ground recess extends in the circumferential direction of the raceway of the outer ring over a length which is at most the circumferential distance between a contact point of a first rolling body and a contact point of a second rolling body that, due to a third rolling body disposed circumferentially between the first and second rolling bodies, is next but one in relation to the first rolling body with the raceway and which is greater than half the diameter of the first rolling body at the point of its greatest diameter, and wherein at least one fitting screw is provided in the abutment region of the at least two ring portions which connects the at least two ring portions, wherein the abutment region between the at least two ring portions intersects an unthreaded shaft portion of the at least one fitting screw.

2. The roller bearing of claim 1, wherein the depth of the ground recess is between 0.05 and 0.0001 times the diameter of the first rolling body at the point of its greatest diameter.

3. The roller bearing of claim 1, wherein at least one of the inner ring and the outer ring is split radially into more than two ring portions, and wherein a ground recess is provided in each abutment region of the ring portions.

4. The roller bearing of claim 1, wherein at least one of the inner ring and the outer ring inner is split by two planes running in a mutually orthogonal manner.

5. The roller bearing of claim 1, wherein the outer ring is split axially into two partial rings to form ring portions that are axially adjacent to one another.

6. The roller bearing of claim 5, wherein the partial rings bear against one another, and wherein at least one radial bore is provided for supplying a lubricant into the interior of the bearing in the region of the axial parting point.

7. The roller bearing of claim 5, wherein the two partial rings are axially spaced apart from one another to form a gap.

8. The roller bearing of claim 1, wherein a contact angle of the first row of rolling bodies and a contact angle of the second row of rolling bodies are different, and wherein the rolling bodies of both rows of rolling bodies are identical.

9. The roller bearing of claim 1, wherein the rolling bodies of each row are accommodated in a respective rolling body cage.

10. A roller bearing comprising:
a first ring that is split to form at least two first ring portions;
a second ring; and
a plurality of rolling bodies configured to roll in first and second rows on corresponding first and second raceways on the first and second rings, wherein a portion of the first raceway encompassing a first abutment region between the at least two first ring portions includes a first recess defined by the first ring that locally deepens the first raceway, wherein the first recess has an arcuate course extending transversely relative to the first abutment region, the greatest radial depth of the first recess lies at the first abutment region, and the first recess extends in the circumferential direction of the first raceway of the first ring, at least half the diameter of the rolling body at the point of its greatest diameter, and wherein the second ring is split to form at least two second ring portions, and at least one fitting screw is provided in one of (1) the first abutment region between the first ring portions, and (2) a second abutment region between the second ring portions, wherein the at least one of the first abutment region and the second abutment region intersects an unthreaded shaft portion of the at least one fitting screw.

11. The roller bearing of claim 10, wherein the first ring is an outer ring, and the second ring is an inner ring.

* * * * *